US011170579B2

(12) United States Patent
Frommhold et al.

(10) Patent No.: US 11,170,579 B2
(45) Date of Patent: Nov. 9, 2021

(54) HYBRID RENDERING

(71) Applicant: Microsoft Technology Licensing, LLC, Redmond, WA (US)

(72) Inventors: Dag Birger Frommhold, Metzingen (DE); Jonathan Michael Lyons, Kirkland, WA (US); Benjamin Markus Thaut, Stuttgart (DE); Ashraf Ayman Michail, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/379,693

(22) Filed: Apr. 9, 2019

(65) Prior Publication Data

US 2020/0327740 A1 Oct. 15, 2020

(51) Int. Cl.
*G06T 19/20* (2011.01)
*G06T 15/40* (2011.01)
*G06T 17/10* (2006.01)

(52) U.S. Cl.
CPC ............ *G06T 19/20* (2013.01); *G06T 15/405* (2013.01); *G06T 17/10* (2013.01); *G06T 2219/2012* (2013.01)

(58) Field of Classification Search
None
See application file for complete search history.

(56) References Cited

U.S. PATENT DOCUMENTS

2007/0035543 A1* 2/2007 David ..................... G06F 9/451
345/420
2010/0045662 A1* 2/2010 Boothroyd ............ G06F 16/972
345/419
2016/0307361 A1* 10/2016 Shionozaki ........... G06T 15/503
2016/0364124 A1* 12/2016 Heater ................ G06F 3/04845
2017/0115488 A1 4/2017 Ambrus et al.
2017/0374341 A1* 12/2017 Michail .................. G06T 15/06
2018/0075654 A1 3/2018 Vembar et al.

FOREIGN PATENT DOCUMENTS

WO 2016077531 A1 5/2016
WO 2017164924 A1 9/2017

OTHER PUBLICATIONS

"International Search Report and Written Opinion Issued in PCT Application No. PCT/US20/021616", dated Jun. 25, 2020, 12 Pages.

* cited by examiner

*Primary Examiner* — Yi Wang
(74) *Attorney, Agent, or Firm* — Alleman Hall Creasman & Tuttle LLP

(57) ABSTRACT

One disclosed example provides a computing device comprising a processing device and a storage device storing instructions executable by the processing device to execute in a first local process an application that outputs digital content for rendering and display. During execution of the application, the instructions are executable to provide, to a second local or remote process, object information regarding an object to be rendered by the second local or remote process, receive, from the second local or remote process, a rendering of the object, output the rendering of the object to display the object, receive a manipulation made to the object, provide, to the second local or remote process, updated object information based on the manipulation made to the object, receive, from the second local or remote process, an updated rendering of the object, and output the updated rendering of the object to display the object.

10 Claims, 6 Drawing Sheets

HYBRID RENDERING

BACKGROUND

Computing devices commonly include graphics rendering pipelines to render three-dimensional models for display on a two-dimensional display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to hybrid rendering. One disclosed example provides a computing device comprising a processing device and a storage device storing instructions executable by the processing device to execute in a first local process an application that outputs digital content for rendering and display. The instructions are executable to provide, to a second local or remote process, object information regarding an object to be rendered by the second local or remote process, receive from the second local or remote process a rendering of the object, output to a display the rendering of the object to display the object, receive a manipulation made to the object, provide, to the second local or remote process, updated object information based on the manipulation made to the object, receive, from the second local or remote process, an updated rendering of the object, and output to the display the updated rendering of the object to display the object.

Another example provides a computing system comprising a processing device and a storage device storing instructions executable by the processing device to receive, from a computing device, object information regarding an object to be rendered, based on the object information received, render the object, provide, to the computing device, a rendering of the object, receive, from the computing device, updated object information regarding a manipulation made to the object, render the object based on the updated object information received regarding the manipulation made to the object, and provide, to the computing device, an updated rendering of the object.

Another example provides a method enacted on a computing device, the method comprising executing an application that outputs digital content for rendering and display, during execution of the application, identifying a first object of the digital content to be rendered remotely, and also identifying a second object of the digital content to be rendered locally, providing, to a remote computing system, object information regarding the first object to be rendered by the remote computing system, receiving, from the remote computing system, a rendering of the first object, locally rendering the second object to generate a rendering of the second object, and compositing the rendering of the first object and the rendering of the second object for display as a composite frame.

DETAILED DESCRIPTION

Figure 1A:
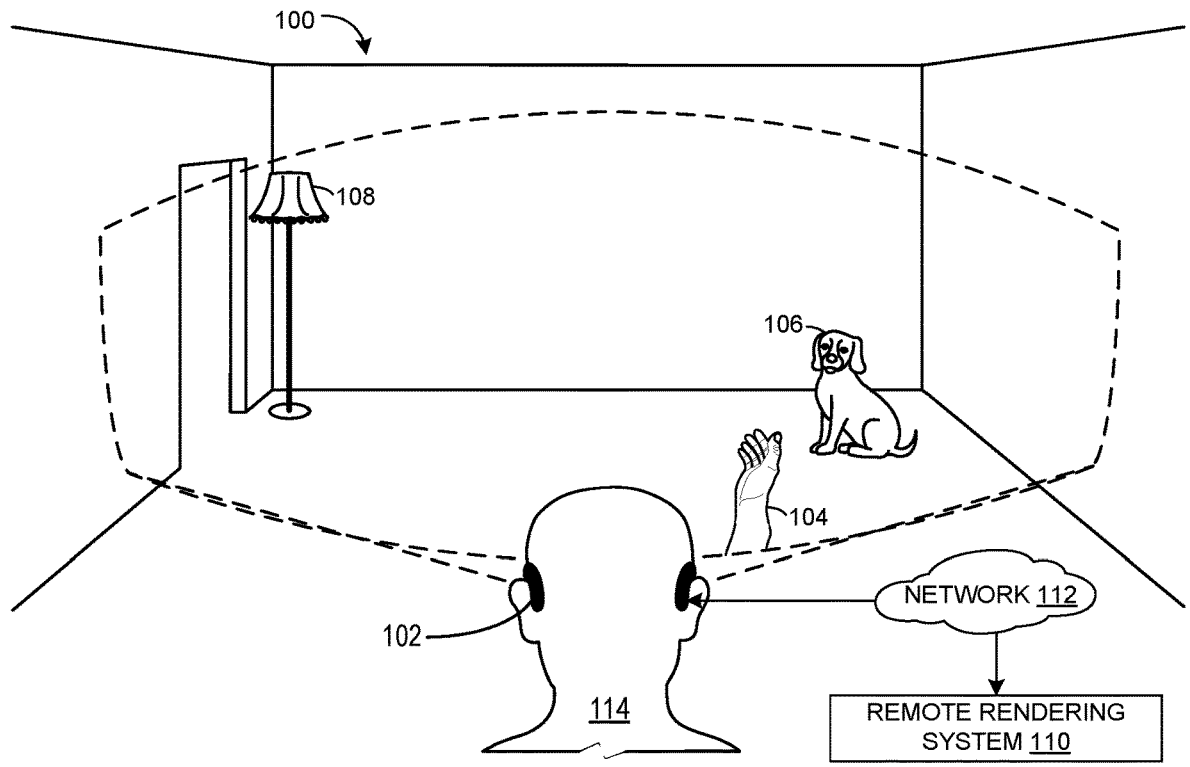
FIGS. 1A and 1B depict an example use environment in which a computing device composites locally-rendered and remotely-rendered digital content for display as a composite frame.

Processing hardware on a computing device may limit the rendering capabilities of the computing device. For example, the rendering of a complex model may be constrained by the clock speed, amount of available memory, memory bandwidth, and/or other characteristic of a graphics processing unit (GPU) or a central processing unit (CPU) local to the computing device. In particular, highly mobile devices, such as cellphones and untethered head-mounted display devices (e.g. that are not connected to another computing device via a wired connection) may not have enough GPU and/or CPU power to render complex scenes with acceptable performance.

Various approaches may be taken to mitigate such issues. For example, a computing device may be configured to decimate a complex model to simplify the model for rendering. However, decimation removes detail from a model, which may compromise a desired visual accuracy of the model. As another approach, instead of decimating a model, a computing device may be configured to run an application remotely, such that a high-powered remote computing system renders all digital content for the application and transfers rendered images (e.g. as a video stream) to the computing device. The rendered images may include complete detail of a corresponding model. However, such a solution shifts all application logic to the remote computing system. As a result, if the computing device loses network connectivity, the computing device may be unable to display remotely-rendered content until a network connection is reestablished. Further, network transfer of remotely-rendered content may too slow for latency-sensitive content, such as when a displayed model is manipulated.

In addition to the problems described above, remotely rendering all content for an application poses various other limitations. For example, systems that render all content remotely may not provide local rendering capabilities, input capabilities, hardware access, etc. to a client device, and thus not allow application developers to designate content for local rendering rather than remote rendering. The ability to perform local rendering may be relevant, for example, for developers who wish to use a specific game engine and/or user interface framework to write application code, for latency-sensitive use cases (e.g. inking, animation or other content correlated with a real-world object, etc.), and for applications configured to be run offline that integrate remotely-rendered content on-demand for specific use cases.

Accordingly, examples are disclosed that may provide such capabilities to a client computing device via a hybrid rendering system that allows application developers to include logic for generating both remotely-rendered content and locally-rendered content for compositing into locally-displayed imagery. For example, more complex content such as computer-aided design models may be rendered on a remote computing system and streamed to a client device executing an application that generates and/or displays the models. The client device may augment the remotely-rendered content with locally-rendered content, such as light-weight, lower-latency (e.g. user interface/user experience elements, inking, content correlated with a real-world object such as an articulated hand, etc.). The client device also may perform depth-correct blending to provide proper occlusion relations between remotely- and locally-rendered content. Further, the remote computing system may expose a remote scene graph API that the client device may use to interact with remotely-rendered content, for example, by updating materials, manipulating object transforms, injecting new content into the remote scene, and performing raycast queries. This may help to leverage the processing capabilities of a remote computing system without running an entire application in the cloud. By using a remote procedure call (RPC) mechanism to interact with remotely-rendered content, the hybrid rendering system provides the client device control over scene elements (orientation, position, scaling, material properties, etc.) rendered remotely, and thus permits all application logic to run locally on the client device. Further, models that are designated for rendering remotely may also be rendered locally (e.g. using substitute or decimated content) in the event that network connectivity is lost or not available.

FIG. 1A depicts an example use environment 100 in which a computing device 102 provides interaction capabilities with remotely-rendered content, and also augments remotely-rendered content with locally-rendered content. In the example of FIG. 1A, the computing device 102 comprises a mixed reality display device configured to admix virtual reality imagery (e.g. holographic imagery) with real-world imagery via a see-through display. In other examples, the computing device 102 may comprise a different mobile computing device (a virtual reality display device, a cell phone, a tablet, etc.), a laptop computer, a personal computer, a game console, or any other suitable computing device. While depicted as a residential environment 100 in this example, the examples described herein may be implemented in any other suitable use environments. Examples of other use environments include other indoor spaces, such as commercial spaces (e.g. offices, schools, warehouses, etc.), and outdoor spaces (e.g. construction sites, parks, etc.).

Returning to FIG. 1A, the computing device 102 displays a composite frame comprising a locally-rendered hand 104, a remotely-rendered dog 106, and a remotely-rendered lamp 108. Prior to rendering and displaying these objects, an application executed on the computing device 102 requests to load a model of a scene and identifies within the model content to render locally and content to render remotely. For example, a selected application for which the computing device 102 requests to load the model may include, for each object, conditional logic (e.g. based on network bandwidth, complexity of the object, etc.) or absolute logic regarding how to render the object.

For each object 106, 108 identified for remote rendering, the computing device 102 provides object information to the remote rendering system 110 via a network 112. The object information may comprise any suitable information regarding the object(s) 106, 108 to be rendered remotely. In some examples, the object information comprises a three-dimensional model (e.g. a high-polygon mesh comprising multiple polygons per displayed pixel, a voxel-based model, etc.) including a geometry for each object 106, 108. The object information also may comprise a material (e.g. a texture) for each object 106, 108. Further, the object information also may comprise scene information describing locations and/or orientations of each object 106, 108 within the scene, which may be absolute or relative to another object in the scene. In other examples, the object information comprises a request to load and/or update an existing model stored by the remote rendering system 110, for example, a model stored during development of the application.

The remote rendering system 110 may receive the object information (from the computing device 102 or another device or process) prior to or during execution of the application for which the object 106, 108 is to be rendered and displayed. When the remote rendering system 110 receives the object information prior to runtime, the remote rendering system 110 may store the object information for retrieval during runtime, e.g. upon receiving a request to load and/or update a model containing the object information. In any instance, the remote rendering system 110 stores the information received from the computing device 102 in a scene graph or other suitable data structure accessible by the computing device 102.

The computing device 102 may also provide information regarding a sensed or predicted pose (hand, head, etc.) and/or eye gaze direction of a user 114 to the remote rendering system. In some examples, the computing device 102 may determine a virtual camera location based upon a sensed pose/gaze, and may provide the virtual camera location determined to the remote rendering system 110 for input into the rendering pipeline. In other examples, the computing device 102 may provide sensor data (e.g. raw or processed sensor data) regarding a sensed pose/gaze direction to the remote rendering system 110, which the remote rendering system 110 may use to determine a virtual camera transform for rendering. The remote rendering system 110 inputs the object information and virtual camera location into a rendering pipeline, and renders each object 106, 108. For each object 106, 108, the rendering pipeline outputs a rendering of the object, which may take the form of rendered pixels or any other suitable representation of each rendered object. The rendering of the object comprises a color buffer and a depth buffer. The remote rendering system 110 then provides the color buffer and optionally the depth buffer (or other representation of depth data) to the computing device 102 as video data (e.g. a compressed video stream).

The computing device 102 may locally render the hand 104, for example, based on a sensed position of a real hand within a field of view of an image sensor of the computing device 102, and optionally based on depth data received from the remote rendering system 110. In this manner, the representation of the hand 104 rendered locally may be rendered closer to real-time than an object rendered remotely. To help compensate for network latency, the computing device 102 may reproject the renderings received from the remote rendering system 110. This may comprise reprojecting the color buffer and optionally the depth buffer of the renderings received from the remote rendering system 110, for example, based on recently-obtained pose/gaze data. Any other suitable latency-mitigation and image stabilization process may be performed in addition or alternatively to reprojecting the renderings received from the remote rendering system 110.

As described in more detail below, the computing device 102 composites the renderings of the dog 106 and lamp 108 with the rendering of the hand 104 for display as a composite frame. To help stabilize the scene and compensate for any movement during the time between rendering of the locally rendered objects/reprojection of the remotely rendered objects and displaying the composited image, the computing device may perform a late-stage reprojection (LSR) process before outputting the composite frame for display, as described in more detail below.

Figure 1B:
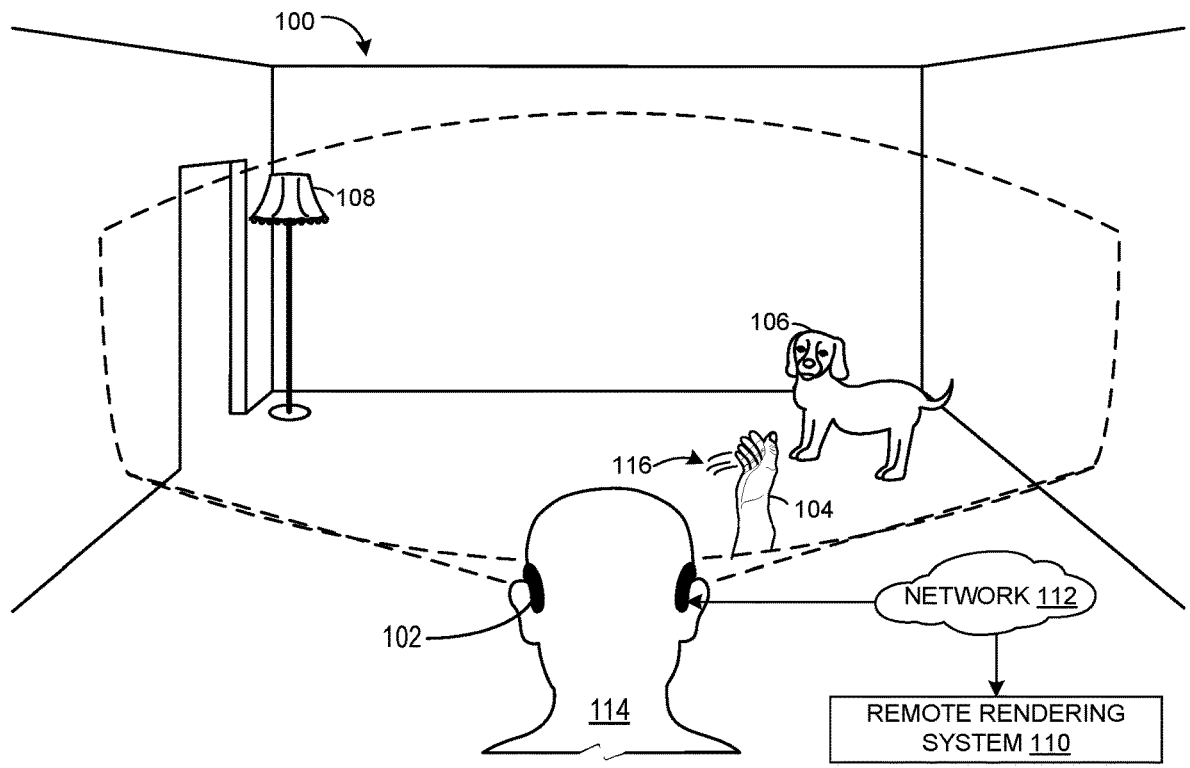

Once the scene is rendered and displayed, a user may wish to interact with the displayed content. In the example of FIG. 1A, the user 114 may interact with the displayed lamp 108 (e.g. to move the lamp, to power the lamp on/off, etc.), and also may interact with the displayed dog 106. As the user 114 interacts with a remotely-rendered object, the computing device 102 performs a call to a remote API regarding a manipulation made to the object and receives an updated rendering from the remote rendering system 110, which may occur on a frame-by-frame basis in some examples. In FIG. 1B, the computing device 102 provides, to the remote rendering system 110, an input regarding a wave gesture 116 made to manipulate display of the dog 106. In response, the computing device receives an updated rendering of the dog 106 from the remote rendering system 110, and outputs the updated rendering for display. As shown in FIG. 1B, the dog 106 is rendered and displayed as standing in response to the wave gesture input 116.

Figure 2:
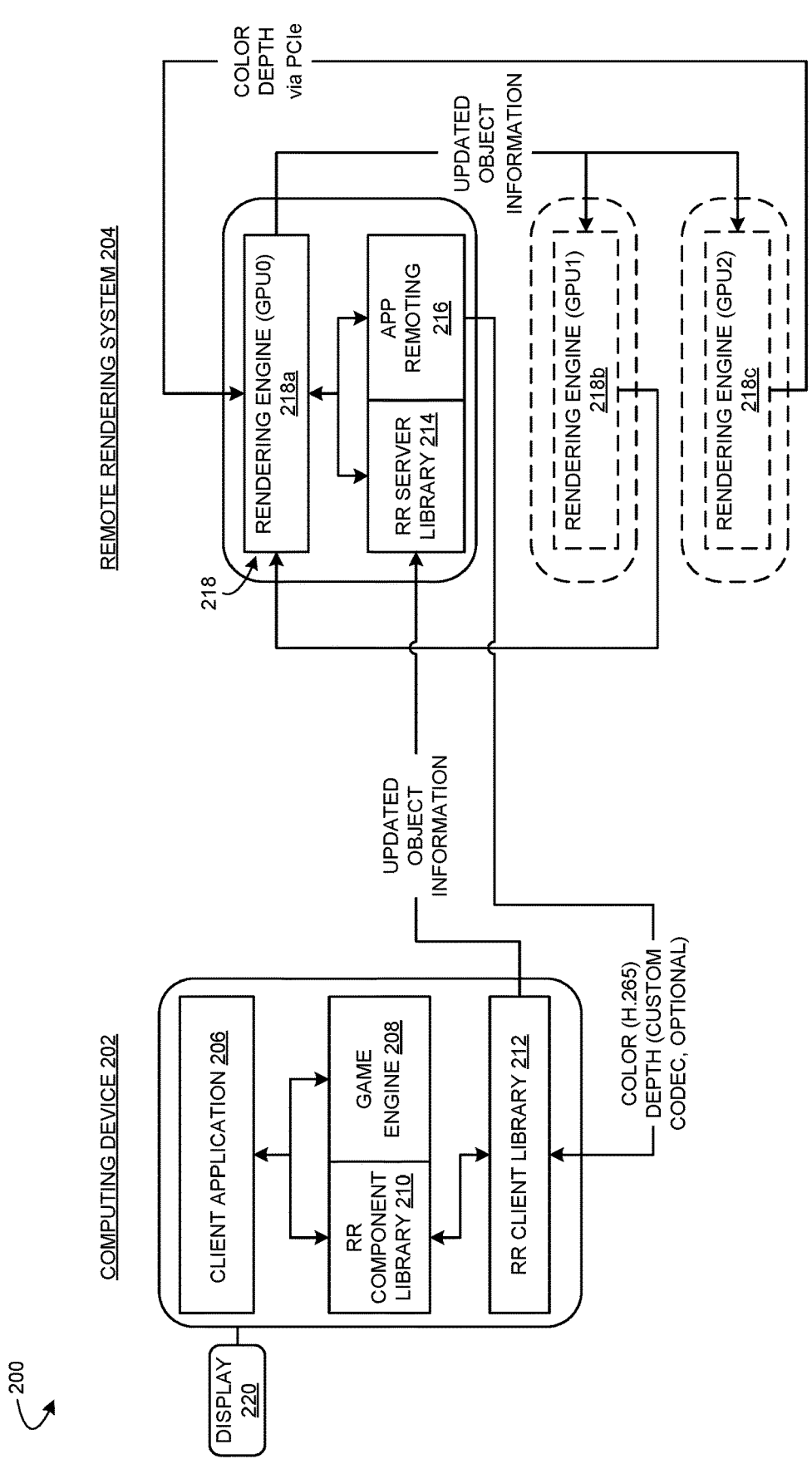
FIG. 2 is a block diagram illustrating an example hybrid rendering system.

FIG. 2 depicts an example hybrid rendering system 200 comprising a computing device 202 and a remote rendering system 204. Example computing devices suitable for use as the computing device 202 include mobile computing devices (augmented reality display devices, virtual reality display devices, cellphones, tablets, etc.), laptop computing devices, desktop computing devices, game consoles, etc. The remote rendering system 204 may comprise a second computing system having any number and type of computing device(s) having sufficient rendering capabilities to implement the hybrid rendering processes described herein. In some examples, the remote rendering system 204 comprises one or more server computers, such as those hosted in a cloud computing environment. In other examples, the remote rendering system 204 comprises one or more server computers, desktop computers, and/or other computing device(s) local to the use environment of the computing device 202.

The computing device 202 comprises a client application 206 that outputs digital content for rendering and display. Examples of client applications include applications for gaming, computer-aided design/visualization, and instruction/education. The client application 206 is configured to interface a game engine 208 or other rendering engine. Any suitable rendering engine may be used as the game engine 208, including first- and third-party software that exists independently of a remote rendering service. The term "remote rendering service" as used herein refers to a service that uses a remotely-hosted rendering engine to render pixels for transmission to a client computing device (e.g. computing device 202) for local display and supports hybrid rendering as described herein.

The decision regarding how to render digital content within the client application 206 is a development-time decision available to an application developer. For example, the application developer may include logic within a node of a scene graph or other data structure regarding how to render the object represented by the node of the scene graph. In some examples, the client application 206 may include conditional logic for rendering an object (e.g. render object remotely if network latency is greater than or equal to a threshold). The client application 206 may also comprise absolute logic for rendering an object (e.g. locally render a user interface, remotely render a high-polygon model, etc.). In any instance, logic of the client application 206 may be used to control both a locally-rendered scene and a remotely-rendered scene.

Continuing with FIG. 2, the client application 206 is also configured to interface a remote rendering (RR) component library 210, which may be developed specifically for the game engine 208 used by the computing device 202. The RR component library 210 is configured to interface a RR client library 212, which serves as a client-side endpoint of the remote rendering service. As described in more detail below, the RR client library 212 may be implemented as a lightweight client-side scene graph API that translates API calls to messages which are sent to the remote rendering system 204.

The remote rendering system 204 comprises a RR server library 214, which serves as a remote endpoint of the remote rendering service. The RR server library 214 is configured to receive, via a network, object information and updated object information (e.g. scene graph updates) from the RR client library 212 of the computing device 202. The remote rendering system 204 may expose, via the RR server library 214, a lightweight scene graph API for providing and updating scene graph data between the computing device 202 and the remoting rendering system 204. Scene graph data may include, for example, meshes, material properties (e.g. for physically-based shading and/or Phong shading), three-dimensional text, lighting, tone mapping, node transforms, and/or use-specific features (e.g. cut planes). In some examples, the scene graph data may also be cached on the computing device 202, which may help the computing device 202 quickly access the scene graph data during runtime, for example when a network connection to the remote rendering system 204 is not available.

The scene graph may be used, for example, to instruct the remote rendering system 204 to load a specific scene, inform the computing device 202 of a frame scene loaded by the remote rendering system 204, allow the computing device 202 to manipulate data in the remote scene graph (e.g. to specify animations/movements of an object), allow the computing device 202 to create new nodes in the remote scene graph and manipulate the nodes, and/or allow the computing device 202 to perform asynchronous queries such as raycasts into the remote scene graph to be executed by the remote rendering system 204.

In some instances, the scene graph may be wrapped in various classes based on the tools/engine (e.g. game engine 208) used by the computing device 202. Further, the scene graph API may be projected into target languages such as C, C#, and JavaScript. This may expose the capabilities of the remote rendering system 204 to arbitrary third-party applications, independently of the game/rendering engine such applications use. The remote rendering system 204 also may be leveraged in web and mobile applications, in addition or alternatively to mixed and virtual reality applications.

The remote rendering system 204 further comprises an app remoting service 216 configured to provide input, such as updated object information (e.g. scene graph data) received from the computing device 202 to a rendering engine 218, and provide a rendering of the object to the computing device 202. The app remoting service 216 may take the form of first- or third-party software that exists independently of the remote rendering service, in some examples. Based on the updated object information received, the rendering engine 218 inputs the updated object information into a rendering pipeline and renders the object to generate a rendering of the object. In some instances, the rendering pipeline may support custom shaders.

The rendering engine 218 may be implemented via one or more processing devices. In the example shown in FIG. 2, the rendering engine 218 is implemented via a GPUs 218a configured to render high-polygon content. The rendering engine 218 also may be implemented via a CPU (not shown) that provides rendering tasks to the GPU. Further, the rendering engine may include other processing devices, such as other GPUs 218b, 218c in some examples. In other examples, any other suitable quantity and/or type of processing devices may be used to implement the rendering engine 218, including the examples described below with reference to FIG. 6. It will be understood that an off-the-shelf commercial engine may be utilized as the rendering engine 218 in some examples.

The hybrid rendering system 200 may implement various strategies to handle large scene graphs and draw call counts. For example, the remote rendering system 204 may structure a mesh or other model such that material and transform data may be pulled from a GPU-side buffer, and also may leverage a graphics-oriented API suite (such as DirectX12 (DX12), available from Microsoft Corp. of Redmond, Wash.) and indirect drawing to help reduce CPU-side draw call overhead. For a client application 206 associated with a large scene graph, the remote rendering system 204 may reference a compact representation of the scene graph or may modify the architecture of the scene graph to operate in a data-orientated fashion (e.g. Entity Component System). Further, to help update potentially significant subsets of the scene graph during runtime, the hybrid rendering system 200 may employ transform compression for network transfer of data between the computing device 202 and the remote rendering system 204.

The app remoting service 216 provides a rendering from the rendering engine 218 to the RR client library 212 as video data (e.g. a compressed video stream) comprising a color/frame buffer. In some instances, limited Wi-Fi or other network bandwidth may restrict the amount of color/frame buffer data that may be transferred to the computing device 202. Thus, the app remoting service 216 may use a video compression standard, such as H.265, to stream the color buffer to the computing device 202. The app remoting service 216 also may stream a depth buffer or other representation of depth data to the computing device 202, for example via high-efficiency video coding or a custom codec configured to accurately compress depth data.

In implementations that transmit/receive a compressed depth buffer, the RR client library 212 receives and reconstructs the depth buffer for the remotely-rendered content. In some examples, the computing device 202 may implement one or more latency-mitigation strategies before augmenting the remotely-rendered content with locally-rendered content. For example, while consuming and using recently-obtained information regarding hand and head/eye tracking on the computing device 202, the computing device 202 may render an image using a camera transform that was used to render the remotely-rendered image. As another example, the computing device 202 may leverage recently-obtained pose/gaze data to reproject the color buffer and the depth buffer of the remotely-rendered content.

The hybrid rendering system 200 further may implement various other latency-mitigation strategies. As one example, the remote rendering system 204 may reduce latency by performing chroma subsampling on the color buffer to reduce the quantity of data sent. The remote rendering system 204 also may perform multi-GPU rendering, such as tile-based and/or geometry/cluster-based multi-GPU rendering. In an example geometry/cluster-based multi-GPU rendering process, a geometry of a model is subdivided into clusters and distributed across multiple GPUs, and each GPU renders its respective assigned geometry and provides color and depth buffers over a PCIe bus to a master GPU (e.g. 218a in FIG. 2), which performs depth-aware buffer merging and video encoding. Multi-GPU rendering may help to support rendering large meshes (e.g. 100M+ polygons) at sufficient frame rates (e.g. 60 Hz), and also may reduce latency by reducing overall rendering time. As other example latency- and bandwidth-reduction strategies, the app remoting service 216 may interleave encoding of stereo images at 120 Hz, or may encode the delta between a reprojected and an original frame for a second eye rather than a full second image. Further, hybrid rendering itself may help to reduce latency compared to a system that renders all content remotely, as at least some content may be rendered locally on the computing device 202 rather than transferred over a network.

Once the computing device 202 decompresses the depth buffer received from the remote computing system 204 (in implementations that transmit/receive a compressed depth buffer) or otherwise performs any necessary processing on depth information received, the computing device 202 may locally render an object with the depth buffer or other depth information bound to the rendering pipeline. The computing device 202 composites the remotely- and locally-rendered content for display as a composite frame via any suitable frame buffer merging process. In some examples, the computing device performs depth-correct blending to provide a depth-correct composition of a scene. Depth-correct blending may comprise, for example, performing a depth test (e.g. a z-test) on the depth buffer of the remotely-rendered content and the depth buffer of the locally-rendered content, and compositing based on the depth test. Such blending may be useful in a variety of scenarios, such as for inking features, client-side slates, text annotations rendered locally for a specific depth coordinate (e.g. to preserve text legibility), and for direct manipulation and user interface features where remotely-rendered content exhibits depth-correct relations respective to locally-rendered content. In other examples, the locally rendered content resides at a fixed position with respect to the remotely-rendered content (e.g. a user interface that resides on top of a remotely-rendered background), and the computing device 202 may merge the respective frames without depth testing.

After compositing the locally- and remotely-rendered content for display as a composite frame, the computing device 202 may perform a late stage reprojection process to further stabilize the composite frame. In some examples, the computing device 202 may reproject only the color buffer of the composite frame. In other examples, the reprojection also may be performed based on the depth buffer of the composite frame. The reprojection may be performed based upon any suitable information, such as motion vectors encoded in the video stream, or motion sensor data from one or more motion sensors residing on the computing device 202. The computing device 202 is configured to output the composite frame via a display 220, which may be integrated with the computing device 202 in a common enclosure or peripheral to the computing device 202. Any suitable display may be used, including see-through displays (e.g. waveguide-based or prism-based displays) and opaque displays.

In the examples of FIGS. 1A-1B and 2, a remote rendering system (respectively 110 and 204) receives object information and updated object information from a single computing device (respectively 102 and 202). In other examples, a remote rendering system may service multiple computing devices that contribute to a same scene. For example, a remote rendering system may render a scene graph for users of separate augmented reality display devices, where each user may contribute updates to the same scene graph. In a more specific example, a remote rendering system may render the same objects within a scene from different perspectives for each user based on a position of each user within the scene. Further, in some examples, multiple network-accessible cloud servers may collaboratively render a scene.

The hybrid rendering system 200 described herein may help to render high-polygon scenes (e.g. computer-aided design models, construction/manufacturing documentation, etc.), comprising numerous individual objects, at suitably high frame rates. In contrast, local rendering engines that do not support hybrid rendering may not be able to render at suitably high frame rates for such applications. While shown in FIG. 2 as separate computing systems, in some instances, the computing device 202 itself may also execute the remote rendering system 204 (e.g. run on the same system in different processes). In some such instances, the hybrid rendering examples described herein may be used for local scenarios enacted on the computing device 202, such as compositing many 3D applications running at independent phase and framerates.

Figure 3:
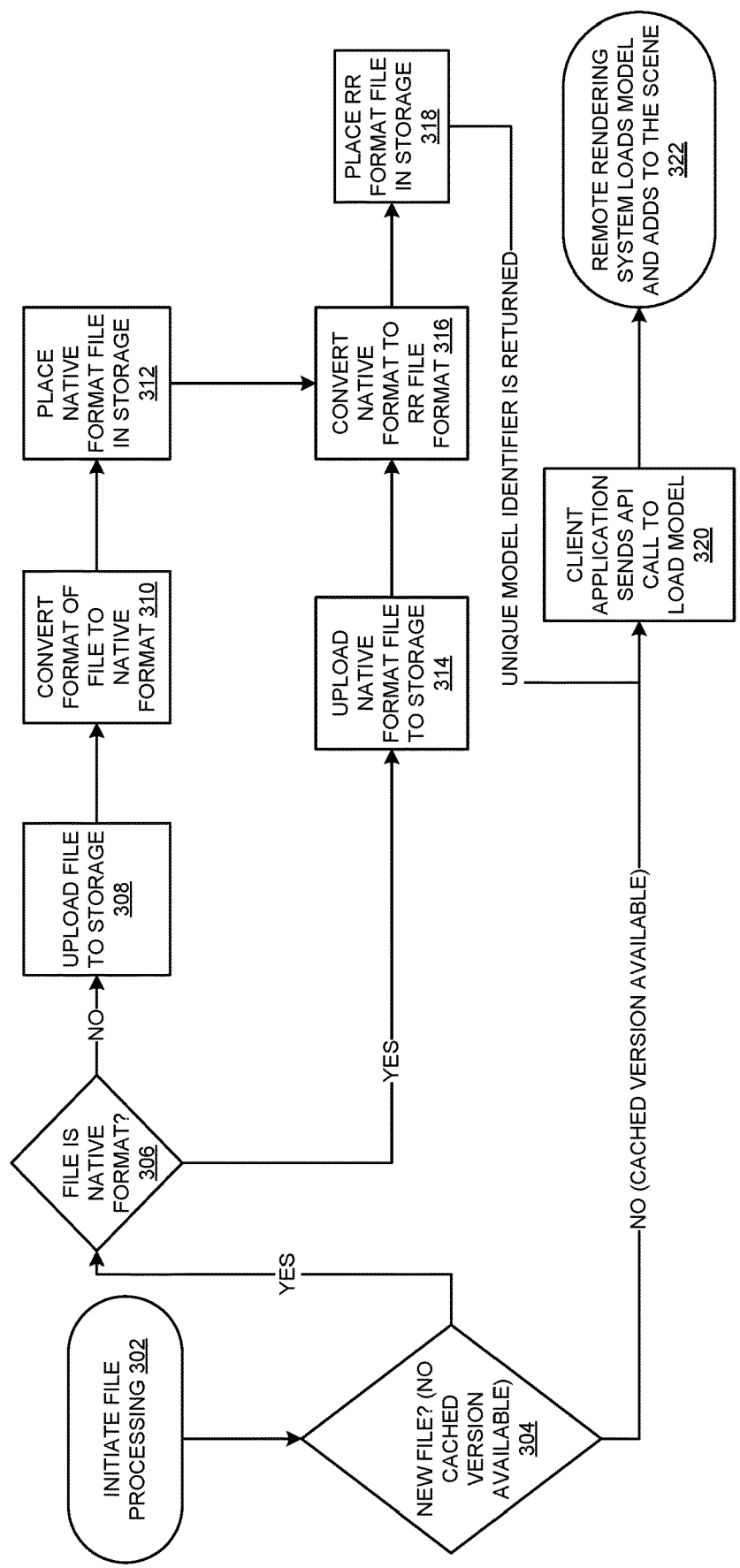
FIG. 3 is a flow diagram illustrating an example method of preparing content for rendering.

In some instances, digital content may be prepared for rendering prior to entering the rendering pipeline. FIG. 3 depicts an example method 300 optionally performed by the remote rendering service, which may help prepare digital content for hybrid rendering. In some examples, method 300 may be implemented as stored instructions executable by a processing device of a hybrid rendering system, such as system 200.

At 302, method 300 comprises initiating file processing. In some examples, a client device (e.g. computing device 102 and/or 202) may upload assets (e.g. as a zipped archive including individual files, such as a model, materials, etc.) to a cloud storage location through a scene graph API as described above. In some examples, this may be performed via a web site built on the scene graph API. In other examples, a computing device may locally initiate file processing.

At 304, method 300 comprises determining whether a file uploaded at step 302 is a new file by determining whether a cached version of the file is available to the remote rendering service. If a cashed version of the file is available, then method 300 proceeds to 320. If a cached version of the file is not available, then method 300 proceeds to 306, where the remote rendering service determines whether the file comprises a native file format readable by the rendering engine (e.g. rendering engine 218 in FIG. 2). If the format of the file is the native file format, then method 300 proceeds to 314, where the remote rendering service uploads the file to a cloud storage location.

If the remote rendering service determines, at 306, that the format of the file is different than the native file format, then method 300 proceeds to 308, where the file is uploaded to a cloud storage location. At 310, method 300 comprises converting the format of the stored file to the native file format.

At 312, the remote rendering service places the native file format version of the file in a network-accessible storage location. The remote rendering service processes the file in the native file format, at 316, to convert the native file format to a remote rendering file format, such as a binary format. At 318, the remote rendering service places the remote rendering file format version of the file in storage, and also returns an identifier (ID) for the uploaded content (e.g. a unique model ID), which may inform the client device that the file was properly uploaded.

At 320, a client application sends an API call (e.g. via RR client library 212 in FIG. 2) to load a specific model for rendering. At 322, the remote rendering API (RR server library 214 in FIG. 2) uses the ID returned for the specific model to load and the model and initiate the rendering pipeline.

Figure 4:
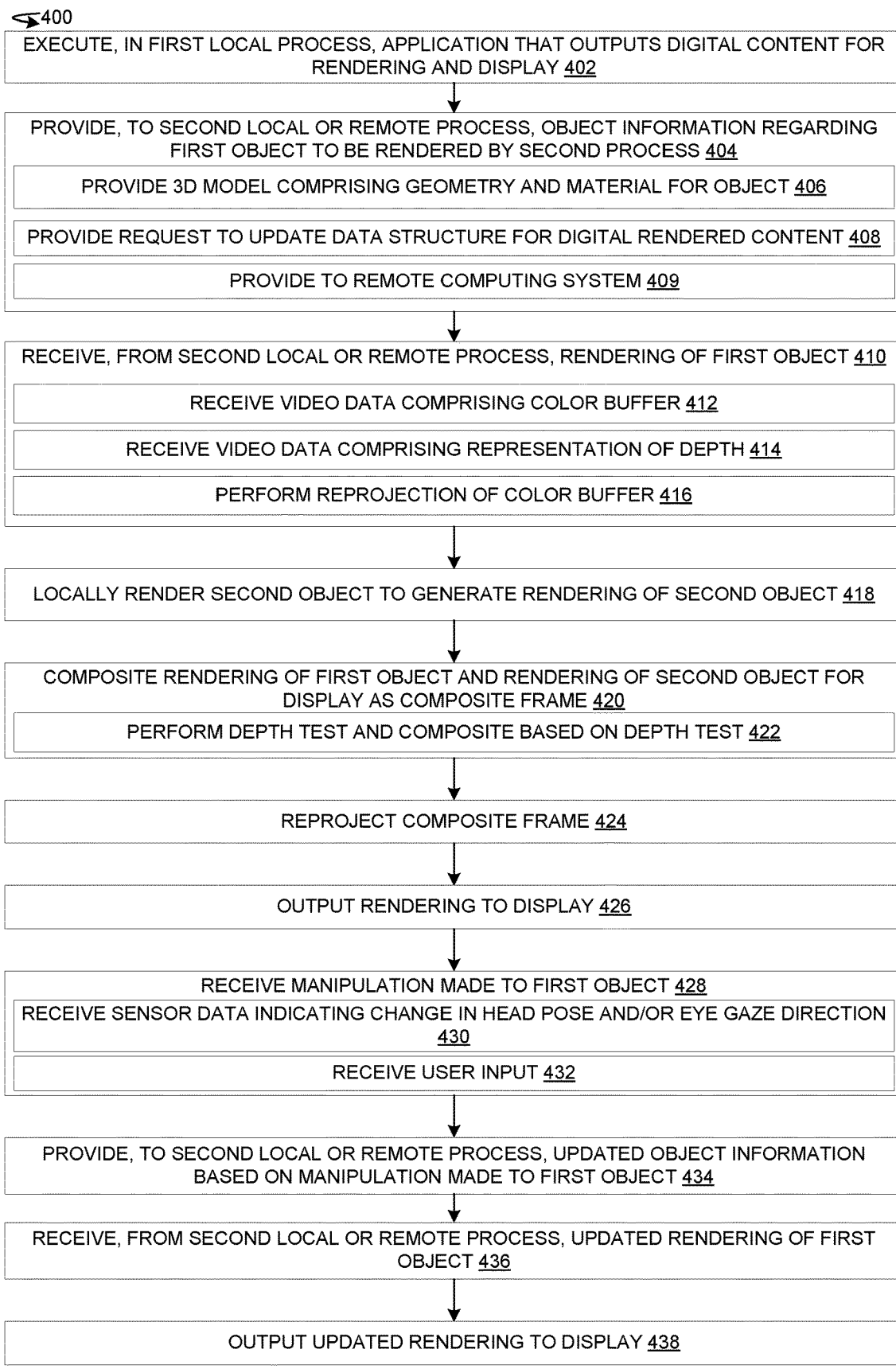
FIG. 4 is a flow diagram illustrating an example method of updating display of a remotely-rendered object based on an input made to manipulate the remotely-rendered object.

FIG. 4 illustrates an example method 400 for implementing hybrid rendering. Method 400 may be implemented as stored instructions executable by a processing device of a client computing device, such as computing device 102 and/or 202.

At 402, method 400 comprises executing, in a first local process, an application that outputs digital content for rendering and display. During execution of the application, method 400 may comprise identifying a first object to be rendered remotely and identifying a second object to be rendered locally. For example, the computing device may identify whether to render an object locally or remotely based on conditional and/or absolute logic authored by an application developer of the application.

At 404, method 400 comprises providing, to a second local or remote process, object information regarding an object to be rendered by the second local or remote process. Providing the object information may include providing a three-dimensional model (e.g. high-polygon mesh, voxel-based model, etc.) comprising a geometry and a material for the object, as indicated at 406. For example, a computing device may provide a model for remote rendering via a scene graph API, as described in FIG. 3. Providing the object information also may comprise providing a request to update a data structure for the digital rendered content, as indicated at 408. For example, a computing device may send an API call to interact with a remote scene graph for a specific model that was previously uploaded. A client computing device may also provide any other suitable information usable by the remote computing system to render the object, such as pose/gaze data and/or a determined virtual camera position. In some examples, providing the object information may comprise providing the object information to a remote computing system (e.g. remote rendering system 110, 204), as indicated at 409. In other examples, providing the object information may comprise providing the object information to a second local process that is different from the first local process.

At 410, method 400 comprises receiving, from the second local or remote process, a rendering of the object. In some examples, receiving the rendering of the object comprises receiving video data comprising a color buffer, as indicated at 412. Such video data may also comprise a representation of depth (e.g. a depth buffer or other depth data), as indicated as 414. Further, the computing device may receive compressed video data, which may help to mitigate latency. In other examples, receiving the rendering of the object may comprise receiving any other suitable data from the second local or remote process.

At 416, method 400 may comprise reprojecting the rendering of the object, for example, by reprojecting the color buffer and/or the depth buffer received (at 412 and 414, respectively). Reprojecting the rendering of the object may help to mitigate image instability (e.g. jitter) caused by latency.

In some examples, the object rendered remotely is a first object, and the computing device is configured to locally render one or more other objects. In a more specific example, the computing device may be configured to locally render a graphical user interface element, articulated hands, and/or any other latency-sensitive object, and augment the first object with the locally-rendered content. Thus, at 418, method 400 may comprise locally rendering a second object to generate for a rendering of the second object. Locally rendering the second object may comprise rendering based on a sensed or predicted head pose, eye gaze direction, and/or hand pose, in some examples.

At 420, method 400 comprises compositing the rendering of the first object and the rendering of the second object for display as a composite frame. In some examples, compositing comprises performing a depth test on the depth buffer of the first object and the depth buffer of the second object, and compositing the rendering of the first object and the rendering of the second object based on the depth test, as indicated at 422. In other examples, compositing comprises superimposing the rendering of the second object on top of the rendering of the first object, thereby augmenting the remotely-rendered content with locally-rendered content. In a more specific example, the second object may comprise a user interface element, and compositing may comprise superimposing the user interface element over the rendering of the first object.

At 424, method 400 may comprise reprojecting the color buffer and optionally the depth buffer of the composite frame, which may help to further stabilize display of the composite frame. The computing device may perform such reprojections based upon any suitable information, such as depth information, motion vectors encoded in the video data received from the remote computing system, or motion sensor data from one or more motion sensors residing on the computing device 202. At 426, method 400 comprises outputting, to a display, the rendering of the object to display the object.

At 428, method 400 comprises receiving a manipulation made to the displayed object that was rendered remotely. In some examples, receiving the manipulation may comprise receiving an input of sensor data (raw and/or processed) indicating a change or predicted change in head pose and/or eye gaze direction of a user of the computing device, as indicated at 430. In other examples, receiving the manipulation may comprise receiving a user input, as indicated at 432. Examples of user inputs suitable to manipulate the object include gesture inputs, speech inputs, and button presses. In yet other examples, the receiving of the manipulation made to the displayed object may arise from other sources than a user input or sensor, such as from an animation associated with the displayed object.

At 434, method 400 comprises providing, to the second local or remote process, updated object information based on the manipulation made to the object. In response, the second local or remote process renders the object based on the updated object information received and provides, to the computing device, an updated rendering of the object. Thus, method 400 comprises, at 436, receiving the updated rendering of the object from the second local or remote process. At 438, method 400 comprises outputting, to the display, the updated rendering of the object to display the object. While described in the context of a first object being rendered remotely and a second object being rendered locally, it will be understood that a scene being rendered may include multiple remotely rendered objects and/or multiple locally-rendered objects that are processed and composited according to the examples disclosed herein.

Figure 5:
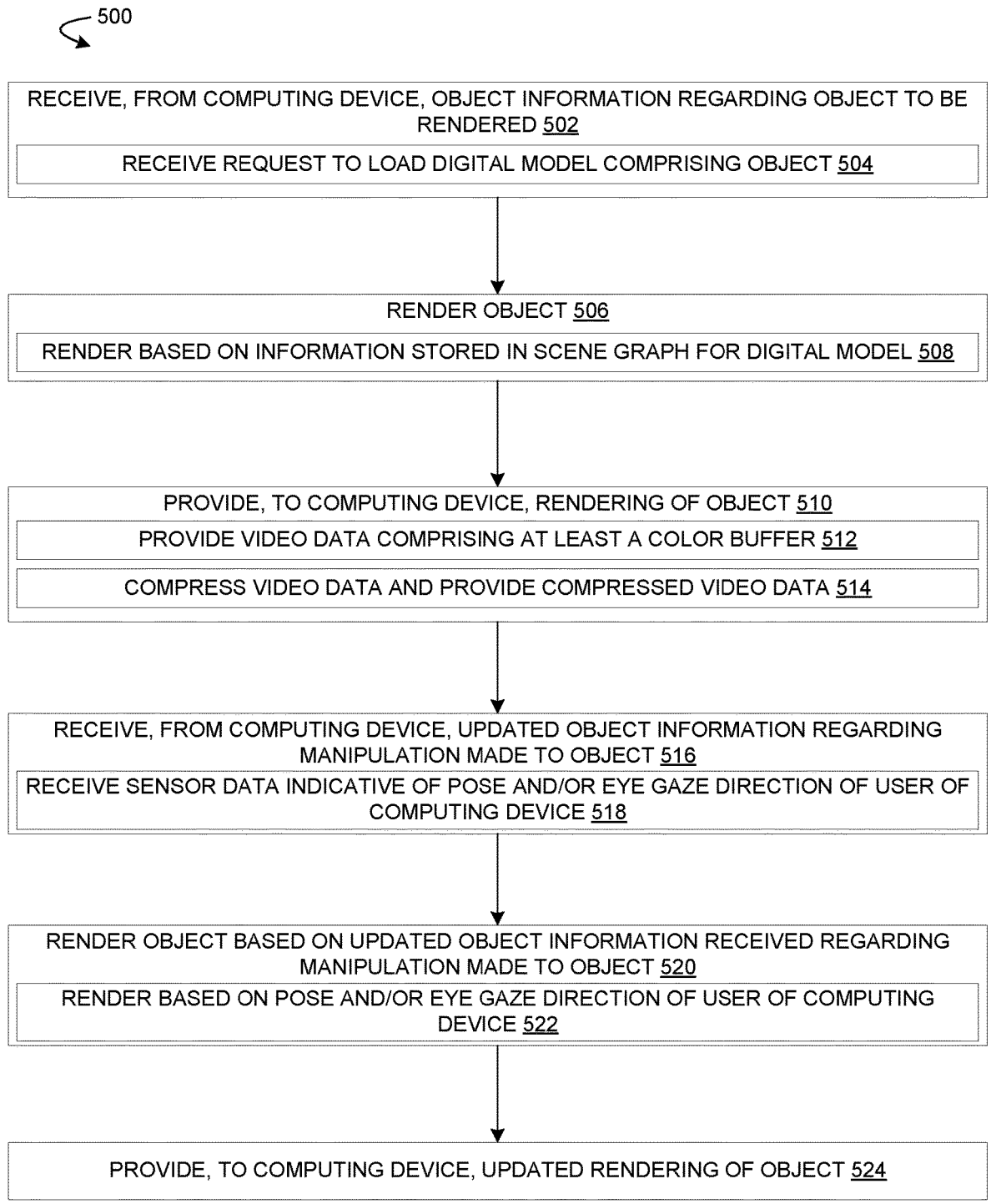
FIG. 5 is a flow diagram illustrating an example method of rendering an object based on information received from a computing device.

FIG. 5 illustrates an example method 500 of rendering an object based on information received from a client computing device. Method 500 may be implemented as stored instructions executable by a processing device of a computing system, such as remote rendering system 110 and/or 204, or a local processes running independently of the process that provides the object to be rendered.

At 502, method 500 comprises receiving, from a computing device, object information regarding an object to be rendered. In some examples, receiving the object information may comprise receiving a request to load a digital model comprising the object, as indicated at 504. In other examples, receiving the object information may comprise receiving a remote API call to update a previously-uploaded data structure for the object.

Based on the object information received, method 500 comprises, at 506, rendering the object. Rendering the object may be performed using any suitable rendering pipeline. As indicated at 508, rendering the object may comprise rendering based on information stored in a scene graph for a digital model, where the object is a node of the scene graph.

At 510, method 500 comprises providing, to the computing device, a rendering of the object. Providing the rendering of the object may comprise providing video data comprising at least a color buffer, as indicated at 512. In a more specific example, the video data may comprise the color buffer and a representation of depth (e.g. a depth buffer). Further, in some examples, the video data may be compressed, as indicated at 514.

At 516, method 500 comprises receiving, from the computing device, updated object information regarding a manipulation made to the object. Receiving the updated object information may comprise receiving sensor data (raw and/or processed) indicative of a pose/gaze of a user of the computing device, as indicated at 518. Information indicative of a pose/gaze of the user may include a virtual camera position determined by the client computing device, in some examples. Receiving the updated object information may additionally or alternatively comprise receiving information regarding a user input to manipulate to the object, such as a gesture input, a speech input, and/or a button press. In such instances, the user input may be sent in raw or processed form (e.g. as a specification of a change to make to the scene graph based upon the user input received). In other examples, any other suitable information may be received, such as information regarding an animation associated with the object.

Method 500 further comprises, at 520, rendering the object based on the updated object information received. When the updated object information is based on a pose/gaze of the user of the computing device, rendering the object may comprise rendering based on the pose and/or gaze, as indicated at 522. For example, a remote computing system may render the object based on a determined virtual camera position received. When the updated object information is based on a user input to the computing device, rendering the object may comprise rendering based on the user input. In other examples, the remote computing system may render the object based on any other information received. At 524, method 500 comprises providing, to the computing device, an updated rendering of the object.

In some examples, the methods and processes described herein may be tied to a computing system of one or more computing devices. In particular, such methods and processes may be implemented as a computer-application program or service, an application-programming interface (API), a library, and/or other computer-program product.

Figure 6:
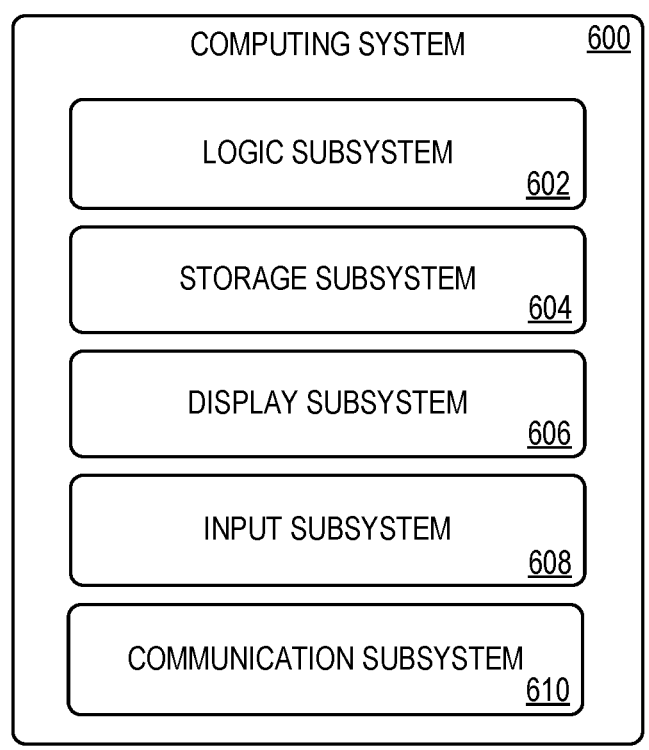
FIG. 6 is a block diagram illustrating an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices (e.g. head-mounted display device), mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine may include one or more hardware or firmware logic machines configured to execute hardware or firmware instructions. Such processors may be implemented as one or more CPUs and/or GPUs in various examples. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 600 implemented to perform a particular function. In some cases, a program or engine may be instantiated via logic machine 602 executing instructions held by storage machine 604. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a computing device, comprising a processing device and a storage device storing instructions executable by the processing device to execute in a first local process an application that outputs digital content for rendering and display, during execution of the application, provide, to a second local or remote process, object information regarding an object to be rendered by the second local or remote process, receive, from the second local or remote process, a rendering of the object, output, to a display, the rendering of the object to display the object, receive a manipulation made to the object, provide, to the second local or remote process, updated object information based on the manipulation made to the object, receive, from the second local or remote process, an updated rendering of the object, and output, to the display, the updated rendering of the object to display the object. In such an example, the instructions may additionally or alternatively be executable to provide the object information by providing a three-dimensional model comprising a geometry of the object. In such an example, the instructions may additionally or alternatively be executable to provide the object information by providing a request to update a data structure for the digital rendered content. In such an example, the rendering of the object may additionally or alternatively comprise video data comprising a color buffer. In such an example, the video data may additionally or alternatively comprise a representation of depth. In such an example, the object may additionally or alternatively comprise a first object, and the instructions may additionally or alternatively be executable to locally render a second object to generate a rendering of the second object, and composite the rendering of the first object and the rendering of the second object for display as a composite frame. In such an example, the rendering of the object received from the second local or remote process may additionally or alternatively comprise a first color buffer, and the instructions may additionally or alternatively be executable to, before compositing the rendering the first object and the rendering of the second object, perform a reprojection of the first color buffer. In such an example, the instructions may additionally or alternatively be executable to, after compositing the rendering of the first object and the rendering of the second object, perform a reprojection of a color buffer of the composite frame. In such an example, the rendering of the first object received from the second local or remote process may additionally or alternatively comprise first depth data, and the rendering of the second object may additionally or alternatively comprise second depth data, and the instructions may additionally or alternatively be executable to composite the rendering of the first object and the rendering of the second object by performing a z-test on the first depth data and the second depth data and compositing the first object and the second object based on the z-test. In such an example, the instructions may additionally or alternatively be executable to receive the manipulation made to the object by receiving sensor data indicating a change in head pose and/or eye gaze direction, and/or by receiving a user input to manipulate the object.

Another example provides a computing system, comprising a processing device, and a storage device storing instructions executable by the processing device to receive, from a computing device, object information regarding an object to be rendered, based on the object information received, render the object, provide, to the computing device, a rendering of the object, receive, from the computing device, updated object information regarding a manipulation made to the object, render the object based on the updated object information received regarding the manipulation made to the object, and provide, to the computing device, an updated rendering of the object. In such an example, the instructions may additionally or alternatively be executable to provide the rendering of the object to the computing device by providing video data comprising a color buffer and a depth buffer. In such an example, the instructions may additionally or alternatively be executable to compress the video data and to provide compressed video data to the computing device. In such an example, the object information may additionally or alternatively comprise a request to load a digital model comprising the object, and the instructions may additionally or alternatively be executable to render the object based on information stored in a scene graph for the digital model. In such an example, the instructions may additionally or alternatively be executable to receive the updated object information by receiving sensor data indicative of a pose of a user of the computing device, and the instructions may additionally or alternatively be executable to render the object based on the pose of the user.

Another example provides a method enacted on a computing device, the method comprising executing an application that outputs digital content for rendering and display, during execution of the application, identifying a first object of the digital content to be rendered remotely, and also identifying a second object of the digital content to be rendered locally, providing, to a remote computing system, object information regarding the first object to be rendered by the remote computing system, receiving, from the remote computing system, a rendering of the first object, locally rendering the second object to generate a rendering of the second object, and compositing the rendering of the first object and the rendering of the second object for display as a composite frame. In such an example, the rendering of the first object may additionally or alternatively comprise a first color buffer and a first depth buffer, the method may additionally or alternatively comprise, before compositing the rendering of the first object and the rendering of the second object, performing a reprojection of at least the first color buffer. In such an example, the method may additionally or alternatively comprise, after compositing the rendering of the first object and the rendering of the second object, performing a reprojection. In such an example, performing the reprojection may additionally or alternatively comprise performing the reprojection based on a head pose of a user. In such an example, the rendering of the first object may additionally or alternatively comprise first depth data, and the rendering of the second object may additionally or alternatively comprise second depth data, the method may additionally or alternatively comprise performing a depth test on the first depth data and the second depth data, and compositing the rendering of the first object and the rendering of the second object based on the depth test.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing device, comprising:
 a processing device; and
  a storage device storing instructions executable by the processing device to:
   execute in a first local process an application that outputs digital content comprising a first object for rendering and display of the first object, the rendering comprising depth data for the first object, the application comprising conditional logic con- figured to determine whether to render an object remotely or locally based at least on a threshold network latency;

during execution of the application, based on the conditional logic, provide, to a second local or remote computing system process, object information regarding a second object to be rendered by the second local or remote computing system process;

receive, from the second local or remote computing system process, a rendering of the second object and depth data for the second object, wherein the rendering of the second object received from the second local or remote computing system process comprises a first color buffer;

perform a reprojection of the first color buffer;

composite the first object as rendered and the second object as rendered for display as a composite frame by performing depth-correct blending between the first object and the second object based on the depth data for the first object and the depth data for the second object;

perform a reprojection of a color buffer of the composite frame;

output, to a display, the composite frame;

receive a manipulation made to the second object;

provide, to the second local or remote computing system process, updated object information based on the manipulation made to the second object;

receive, from the second local or remote computing system process, an updated rendering of the second object; and output, to the display, the updated rendering of the second object to display the second object.

2. The computing device of claim 1, wherein the rendering of the first object received from the second local or remote process comprises first depth data, and wherein the rendering of the second object comprises second depth data, and wherein the instructions are executable to composite the rendering of the first object and the rendering of the second object by performing a z-test on the first depth data and the second depth data and compositing the first object and the second object based on the z-test.

3. The computing device of claim 1, wherein the instructions are executable to provide the object information by providing a three-dimensional model comprising a geometry of the second object.

4. The computing device of claim 1, wherein the instructions are executable to provide the object information by providing a request to update a data structure for the digital rendered content.

5. The computing device of claim 1, wherein the rendering of one or more of the first object and the second object comprises video data.

6. The computing device of claim 5, wherein the video data further comprises a representation of depth.

7. The computing device of claim 1, wherein the instructions are executable to receive the manipulation made to the second object by receiving sensor data indicating a change in head pose and/or eye gaze direction, and/or by receiving a user input to manipulate the object.

8. A method enacted on a computing device, the method comprising:

executing an application that outputs digital content for rendering and display, the application comprising conditional logic configured to determine whether to render an object remotely or locally based at least on a threshold network latency;

during execution of the application:
based on the conditional logic, identifying a first object of the digital content to be rendered remotely, and also identifying a second object of the digital content to be rendered locally;

providing, to a remote computing system, object information regarding the first object to be rendered by the remote computing system;

receiving, from the remote computing system, a rendering of the first object and depth data for the first object, wherein the rendering of the first object comprises a first color buffer;

performing a reprojection of the first color buffer;

locally rendering the second object to generate a rendering of the second object;

compositing the rendering of the first object and the rendering of the second object for display as a composite frame by performing depth-correct blending between the first object and the second object based on the depth data for the first object and depth data for the second object;

perform a reprojection of a color buffer of the composite frame; and output the composite frame for display.

9. The method of claim 8, wherein performing the reprojection of the first color buffer comprises performing the reprojection based on a head pose of a user.

10. The method of claim 8, wherein the rendering of the first object comprises first depth data, and wherein the rendering of the second object comprises second depth data, the method further comprising:

performing a depth test on the first depth data and the second depth data; and compositing the rendering of the first object and the rendering of the second object based on the depth test.

* * * * *